United States Patent Office 3,637,874
Patented Jan. 25, 1972

3,637,874
PREPARATION OF 1,2-DIBROMO-
1,1,2-TRICHLOROETHANE
Terry C. Neubert, Kent, Ohio, assignor to The General
Tire & Rubber Company
No Drawing. Filed May 3, 1968, Ser. No. 726,546
Int. Cl. C07c 17/04
U.S. Cl. 260—658 R                         3 Claims

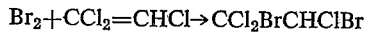

ABSTRACT OF THE DISCLOSURE 1,2-dibromo-1,1,2-trichloroethane is prepared by reacting bromine with trichloroethylene in the presence of a catalytic amount of a monocarboxylic acid. The product is useful as a solvent, as a lachrymator and as an intermediate in chemical reactions.

---

A principal object of the present invention is the provision of new methods for preparation of 1,2-dibromo-1,1,2-trichloroethane. More specifically, it is an object of the invention to provide for the production of such product in high yield and high degree of purity from trichloroethylene.

It has been found that trichloroethylene can be efficiently brominated in short reaction time without dehydrohalogenation or dehalogenation or formation of appreciable quantities of by-products into dibromo trichloroethane by conducting the bromination in the presence of a catalytic amount of a monocarboxylic acid.

The bromination may be conducted in the absence of a solvent, or a solvent which is inert to bromine under the conditions employed for the bromination of the trichloroethylene may be used. Where employed, such an inert solvent will advantageously amount to about 1 to 10 parts for each part of trichloroethylene. Useful solvents include liquid alkanes containing 5 to 10 carbon atoms and a preferred solvent is hexane.

Advantageously, one uses between 0.1 to 1% of the monocarboxylic acid based upon the quantity of trichloroethylene employed in the bromination. Acetic acid is preferred for this purpose and is exemplified by amounts of up to 5.2% (Ex. 3) by weight of the trichloroethylene, but other monocarboxylic acids may be used, particularly such acids containing 1 to 3 carbon atoms. For most effective results, an acid is selected which completely dissolves in the quantity employed in the reaction mixture. Additional examples of monocarboxylic acids which may be employed include propionic acid, chloroacetic acid, bromoacetic acid, trichloroacetic acid, butyric acid, alpha-chloropropionic acid, caproic acid and the like.

The temperature for the bromination may be varied. Temperatures of 10 to 100° C. are useable and advantageously one employs a temperature between about 25 to 75° C.

When the bromination is conducted as described with the reaction of about 1 mole of bromine for each mole of trichloroethylene, a substantially stoichiometirc yield of the product is obtained. Advantageously, slightly less than an equimolar quantity of bromine is used, i.e., 0.90 to 0.99 mole of bromine for each mole of trichloroethylene.

The product of the new methods is useful as a solvent for applications comparable to other halogenated hydrocarbons although its ability to dissolve certain materials finds utility in certain applications. The product also has lachrymatory properties and can be used as a lachrymator. The product of the reaction may be employed as an intermediate in other chemical reactions.

The following details of operations in accordance with the invention and reported data illustrate the further principles and practice of the invention to those skilled in the art. In these examples and throughout the remaining specification and claims, all parts and percentages are by weight and all temperatures are in degrees centigrade unless otherwise specified.

EXAMPLE 1

Dibromotrichloroethane was prepared by a reaction represented by the following equation:

$$Br_2 + CCl_2 = CHCl \rightarrow CCl_2BrCHClBr$$

This bromination was accomplished by mixing together in a glass reaction vessel, equipped with external heating device and internal stirrer, 376 parts of trichloroethylene and 1 part of glacial acetic acid. This mixture was then heated to 50° C. and 454 parts of bromine were added streamwise to the stirred, heated mixture. The addition of the bromine was completed in 60 minutes during which time the temperature rose to 75° C. and then back to 50° C. The reaction mass was stirred for another 90 minutes at 50° C., by which time the brown color of bromine had disappeared, signaling the completion of the reaction. The reaction mass was then cooled to ambient temperature (20–25° C.) and removed from the reaction vessel.

The reaction product was a light yellow, clear liquid. It was divided into two portions and one portion was used directly without further treatment in a chemical process requiring dibromotrichloroethane as a reagent. The second portion, amounting to 200 parts, was mixed with 100 parts of a 5% solution of sodium bicarbonate in water, the mixture was agitated and then allowed to settle into two layers. The bottom layer was separated from the top aqueous layer and washed with 200 parts of water. Again, the mixture was allowed to settle into two layers. The bottom layer was recovered as product.

Elemental analysis plus gas chromatography, infrared and nuclear magnetic resonance analyses of the product established it to be 1,2-dibromo 1,1,2-trichloroethane. Pertinent data from such tests include:

Appearance—light yellow, clear liquid
Refractive index @ 25° C.—1.5660
Density 20° C.—2.25 g./cc.; Infrared: C—H, C—Cl and C—Br present
Boiling Point—evolves $Br_2$ at 164° C.
NMR spectral data—single resonance at 373 cps.
Gas chromatographic analysis on an Apezion L column gave one major peak indicating that 95+% of the sample was one species

*Analysis.*—8.60% carbon, 0.3% hydrogen, 57.3% bromine, 33.9% chlorine.

EXAMPLE 2

The procedure of Example 1 was repeated except that the reaction vessel was initially charged with a mixture of 376 parts trichloroethylene, 1 part of glacial acetic acid and 2000 parts of hexane. At the completion of the reaction, the product was recovered as a clear liquid from the reaction mixture by distillation of the hexane. The liquid was filtered through activated charcoal into a storage container.

EXAMPLE 3

This example illustrates the effect of the catalyst upon the bromination.

There were charged into a glass reaction vessel equipped with internal stirrer 81 parts of trichloroethylene, 330 parts of hexane and 4.2 parts of glacial acetic acid. The mixture was stirred at 35° C. and 110 parts of bromine were added dropwise over a period of 2 hours. The bromine reacted readily when added, this being shown by prompt disappearance of the brown bromine color after addition of each drop. At the end of the bromine additions, the hexane was removed from the reaction mass by distillation, leaving a light yellow, clear liquid with a density of 2.25 at 25° C.

In another case, the same procedure was attempted, omitting, however, the glacial acetic acid. With the addition of drops of bromine, the characteristic bromine color persisted in the reaction mass from an increasing period of time so that when 100 drops of bromine (about 10 parts) had been added, the brown color remained even after 8 hours. At this point, further attempt to continue the bromination was terminated.

The embodiments of the invention in which an exclusive property or right is claimed are defined as follows:

1. In the method of preparing 1,2-dibromo-1,1,2-trichloroethane by reacting bromine with 1,1,2-trichloroethylene at about 10 to 100° C. in about equal mole proportions, the improvement which comprises having the trichloroethylene dissolved in 1 to 10 parts of a liquid alkane containing 5 to 10 carbon atoms for each part of trichloroethylene and having present in the solution a monocarboxylic acid which contains 1 to 3 carbon atoms selected from the group consisting of alkanoic acids, chloroalkanoic acids and bromoalkanoic acids in an amount of about 0.1% to 1% by weight of said trichloroethylene to catalyze the reaction of bromine with the trichloroethylene.

2. The method according to claim 1 of preparing 1,2-dibromo-1,1,2-trichloroethane which comprises reacting 0.90 to 0.99 mole of bromine with a mole of 1,1,2-trichloroethylene at 25 to 75° C. in the presence of about 0.1 to 1% of an alkanoic acid containing 1 to 3 carbon atoms based upon the weight of the trichloroethylene.

3. In the method of preparing 1,2-dibromo-1,1,2-trichloroethane by reacting bromine with 1,1,2-trichloroethylene at about 10° to 100° C. in about equal mole proportions, the improvement which comprises having the trichloroethylene dissolved in 1 to 10 parts of a liquid alkane containing 5 to 10 carbon atoms for each part of trichloroethylene and having present in the solution acetic acid in an amount of about 0.1% to 5.2% by weight of said trichloroethylene to catalyze the reaction of bromine with the trichloroethylene.

References Cited
UNITED STATES PATENTS

| | | | |
|---|---|---|---|
| 2,448,739 | 9/1948 | Ross | 260—660 |
| 2,913,502 | 11/1959 | Elian et al. | 260—658 |
| 2,667,518 | 1/1954 | Wrightson et al. | 260—653.5 |

LEON ZITVER, Primary Examiner

J. A. BOSKA, Assistant Examiner